United States Patent [19]

Hisada et al.

[11] Patent Number: 4,978,962
[45] Date of Patent: Dec. 18, 1990

[54] ELECTRICALLY SCANNING MICROWAVE RADIOMETER

[75] Inventors: Yasumasa Hisada; Kazuo Tachi, both of Ibaraki; Toshio Imatani, Kanagawa; Hirokazu Tanaka, Kanagawa; Hiroyuki Inahata, Kanagawa; Tatsuhiro Noguchi, Kanagawa, all of Japan

[73] Assignees: National Space Development Agency of Japan; Mitsubishi Denki Kabushiki Kaisha, Tokyo, Japan

[21] Appl. No.: 418,164

[22] Filed: Oct. 6, 1989

[30] Foreign Application Priority Data

Nov. 7, 1988 [JP] Japan .................. 63-280626

[51] Int. Cl.$^5$ .......................................... G01S 3/02
[52] U.S. Cl. .................................... 342/351; 343/703
[58] Field of Search .................... 342/351; 343/703

[56] References Cited

U.S. PATENT DOCUMENTS

| | | |
|---|---|---|
| 4,724,439 | 2/1988 | Wiley et al. ............. 342/351 |
| 4,150,379 | 4/1979 | Connors . |
| 3,883,876 | 5/1975 | Roeder et al. . |
| 3,911,435 | 10/1975 | Mardon et al. . |
| 4,015,366 | 4/1977 | Hall III . |
| 4,825,215 | 4/1989 | Wiley ..................... 342/351 |
| 4,864,308 | 9/1989 | Raab et al. ............. 342/351 |
| 4,864,309 | 9/1989 | Wiley et al. ........... 342/351 |

OTHER PUBLICATIONS

Jasik, H., ed. *Antenna Engineering Handbook*, 1st ed. (McGraw-Hill, New York, 1961) pp. 51-25 and 15-26.
Manual of Remote Sensing, 2nd Edition, vol. 1, American Society of Photogrammetry, pp. 612-622, 1983.

*Primary Examiner*—Theodore M. Blum
*Attorney, Agent, or Firm*—Wolf, Greenfield & Sacks

[57] ABSTRACT

An electrically scanning microwave radiometer for measuring the brightness temperature of an object by performing a conical scan of the object. The microwave radiometer comprises a torus-type reflector and an array of radiators. The radiators are grouped to form a plurality of subarrays. The beams formed by the respective subarrays are correspondingly switched to perform the conical scan on the surface of the object. The signals received by the radiators during the conical scan are arithmetically operated to obtain the brightness temperature value of the object located within the width of the antenna beam.

62 Claims, 8 Drawing Sheets

ELECTRICALLY SCANNING MICROWAVE RADIOMETER

BACKGROUND OF THE INVENTION

1. Field of the Invention

The present invention relates to an electrically scanning microwave radiometer mounted in a flying body such as a polar orbit platform and capable if measuring accurately the brightness temperature of an object located in an electrically scanned area.

2. Prior Art

Electrically scanning microwave radiometers are known, as described in "MANUAL OF REMOTE SENSING", second Edition, 612–622, published by American Society of Photogrammetry in 1983.

Figure 1:
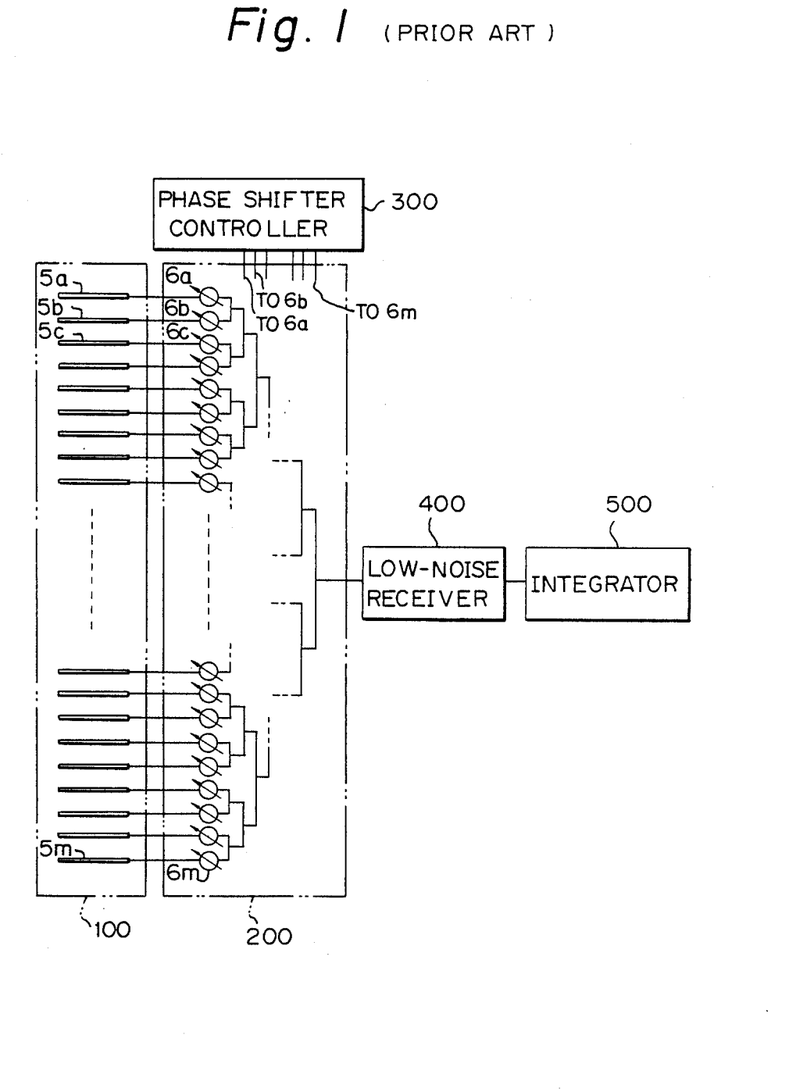
FIG. 1 shows a block diagram of the construction of a conventional electrically scanning microwave radiometer.

FIG. 1 schematically shows a block diagram of an example of a conventional electrically scanning microwave radiometer (ESMR). The ESMR has a planar array antenna 100 comprising a number m of slotted waveguides. One end of each of the slotted waveguides is connected to a phase shifter in a phase shifting unit 200. Each of the phase shifters is under the control of a controller 300 and is connected to a low-noise receiver 400 through an appropriate transmission line. The output receiver 400 is supplied to an integrator 500.

A microwave noise emitted by a measured object is received by planar array antenna 100. The antenna temperature $T_A$ received by planar array antenna 100 is expressed by the following equation:

$$T_A = \frac{1}{4\pi} \int_{4\pi} G(\Omega) T_B(\Omega) d\Omega \quad (1)$$

where $G(\Omega)$ is a grain function of planar array antenna 100; $T_B(\Omega)$ is a brightness temperature of the measured object; and $\Omega$ is a solid angle. The direction of beams formed by planar array antenna 100 can be changed to allow a raster scan to be performed by changing the amount of phase shift set in the respective phase shifters from time to time by means of controller 300.

The signal received by planar array antenna 100 is amplified and detected by low-noise receiver 400 and then integrated by integrator 500, resulting in a final output signal. This output signal represents the average brightness temperature of the measured object in the area defined by the antenna beam width.

Figure 2:
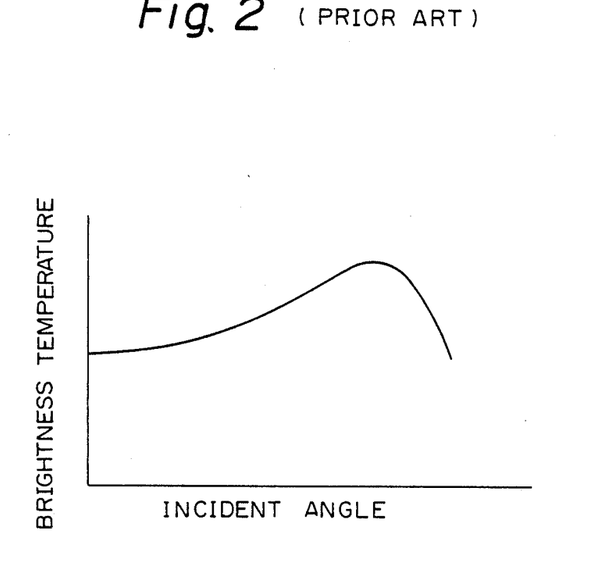
FIG. 2 shows the relationship between the incident angle and the brightness temperature in a conventional electrically scanning microwave radiometer.

The temperature resolution $\Delta T$ representing the minimum receiving sensitivity of the ESMR is expressed as follows:

$$\Delta T = K(T_A + T_R)/\sqrt{B\tau} \quad (2)$$

where K is a constant determined by the construction of low-noise receiver 400; $T_A$ the antenna temperature expressed by equation (1); $T_R$ the receiver noise temperature of low-noise receiver 400; B the band width of low-noise receiver 400; and $\tau$ the integration time of integrator 500. As is clear from equation (2), the temperature resolution $\Delta T$ of the ESMR may become smaller when the integration time of integrator 500 increases. On the other hand, the brightness temperature of the measured object changes, as shown in FIG. 2, in accordance with the incident angle formed between the beam axis of the receiving antenna and the normal axis of the measured object. Accordingly, even if the same object is measured, when the incident angle varies as the antenna beam is scanned, it may be difficult to distinguish a case where the antenna temperature is changed by the change in the brightness temperature of the measured object from a case where the antenna temperature is changed by a variation in the incident angle. To avoid such a problem, the amount of variation in the incident angle is kept within a predetermined range in a conventional ESMR by limiting the scanned width of planar array antenna 100.

As described above, a receiving planar array antenna of a conventional ESMR performs the raster scan on a measured object. If a wide area is scanned, it seams as if the brightness temperature changes as the incident angle varies during scanning.

The conventional electrically scanning microwave radiometers have some other problems too. One problem is how to use a single polarized wave in conjunction with the use of multiple frequencies in order to measure the same object with differently polarized waves or different frequencies. In particular, while scanning enabling multiple frequencies to be used in an electrically scanning microwave radiometer is one of the main problems remaining to be solved, there has to date been no example of making a practicable multiplei-frequency ESMR. In addition, if the orbit of a flying body such as a polar orbit platform is defined, the velocity of the flying body is determined in accordance with the orbit height. Accordingly, a wider scanning area needs a higher scanning velocity, which makes the integration time of integrator 500 shorter and the temperature resolution poorer.

SUMMARY OF THE INVENTION

Accordingly, it is an object of the present invention to provide a microwave radiometer which not only enables variations in the brightness temperature due to changes in the incident angle to be suppressed but also reduces the temperature resolution.

This object is achieved by an electrically scanning microwave radiometer which is capable of performing a conical scan of an object and includes reflector means having a focal line of predetermined configuration and an array of radiators arranged along the focal line of the reflector means. The radiators are grouped to form a plurality of subarrays and each of the subarrays is connected to a corresponding beam switching means. These beams switching means operate to switch beams formed by the radiators correspondingly selected from the respective subarrays to output a different set of signals sequentially. The sequentially output sets of signals are received by signal processing means which arithmetically operate the sets of signals to obtain the value of the brightness temperature of the object.

Since the microwave radiometer of the present invention is capable of electrically performing a conical scan of an area to be measured, this serves to keep the incident angle on the area constant and thus enables variations in the brightness temperature due to changes in the incident angle to be suppressed.

The reflector means may be a torus-type reflector which has a focal line with the configuration of a circular arch. The beam switching means may be a tournament-type beam switching circuit comprising ferrite switches or PIN diode switches. The signal processing means may comprise low-noise receivers each receiving the output of a corresponding one of the beam switching means, integrators each reciving the output of a corresponding one of the low-noise receivers, and a signal processing unit receiving the outputs of the integrators. By using a plurality of tournament-type beam switching circuits, low-noise receivers and integrators, the temperature resolution can be made smaller and the measurement accuracy can be improved. Since switches are used in the tournament-type beam switching circuits, the beams are switched by operating only a portion of the switches, and thus the power consumption of the microwave radiometer can be reduced.

It is another object of the invention to provide a microwave radiometer which is capable of operating at multiple frequencies in differently polarized waves, thereby enabling simultaneous measurements to be performed at different frequencies with different polarizations.

To achieve this object, the electrically scanning microwave radiometer according to the present invention further includes a plurality of polarizaton selective means, frequency selective means or polarization and frequency selective means. Each of the polarization selective means, frequency selective means or polarization and frequency selective means is connected between a corresponding one of the radiators in a subarray and the beam switching means corresponding to the subarray. This enables the same object to be simultaneously measured at multiple frequencies with different polarizations. Accordingly, the resultant antenna temperature obtained by measurment at each frequency with each polarization can be used for extracting physical values such as the depth of piled snow. In addition, since the plane of polarization is not rotated within the scanned area in the microwave radiometer according to the present invention, any change in antenna temperature due to the rotation of the plane of polarization can be suppressed.

In the electrically scanning microwave radiometer according to the present invention, a plurality of arrays of radiators may be arranged along the focal line of the reflector means to allow the number of frequencies used to be increased. If the radiators in the respective arrays are disposed so as to be displaced in the direction of the arrays and all the radiators in the arrays operate at the same frequency, the interval for sampling measurement data may be shortened.

BRIEF DESCRIPTION OF THE DRAWINGS

The invention will be described, by way of example, with reference to the following description of preferred embodiments of the invention and the accompanying drawings, in which.

DESCRIPTION OF PREFERRED EMBODIMENTS

Figure 3:
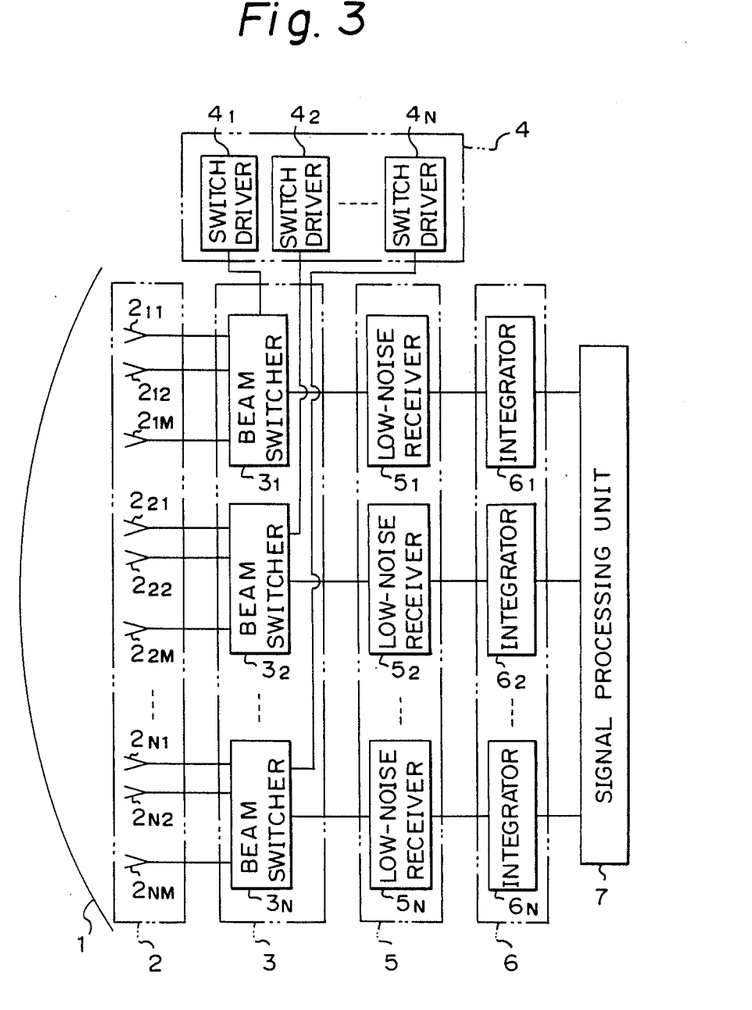
FIG. 3 is a block diagram showing the construction of the first embodiment of an electrically scanning microwave radiometer according to the present invention.
Figure 4:
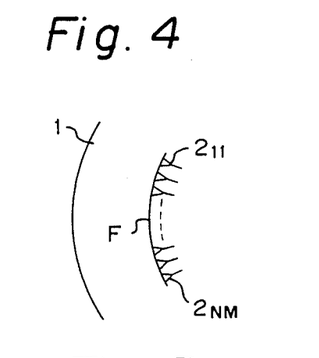
FIG. 4 shows an example of the arrangement of the radiators shown in FIG. 3.

FIG. 3 schematically shows the construction of the first embodiment of an electrically scanning microwave radiometer (ESMR) according to the present invention. In this figure, reflector 1 has a torus-type mirror having a portion in the shape of a circle in the direction of beam scanning and a portion in the shape of a parabola in the direction perpendicular to the direction of beam scanning. These portions consisting of a circle and a parabola have the same focal distance. The aperture diameter of torus-type reflector 1 in the direction of beam scanning is determined by the scanning width. As the scanning width becomes larger, the aperture diameter similarly becomes larger. The aperture diameter of reflector 1 in the direction perpendicular to the direction of beam scanning is determined by the value required by the distance resolution of an ESMR. Facing the torus-type reflector 1 is an array 2 of M×N conical horns ($M \geq 2$, $N \geq 1$) arranged on focal line F of the torus-type reflector and having the configuration of a circular arch, as shown in FIG. 4. The conical horns are grouped in N subarrays, each subarray including M conical horns. For example, the first subarray includes conical horns $2_{11}-2_{1M}$; the secondary subarray includes conical horns $2_{21}-2_{2M}$; and the N-th subarray includes conical horns $2_{N1}-2_{NM}$.

Each of the first to N-th subarrays of conical horns is connected to a corresponding tournament-type beam switching circuit comprising ferrite switches. For example, the first subarray of conical horns $2_{11}-2_{1M}$ is connected to tournament-type beam switching circuit $3_1$; the second subarray of conical horns $2_{21}-2_{2M}$ is connected to tournament-type beam switching circuit $3_2$; and the N-th subarray of conical horns $2_{N1}-2_{NM}$ is connected to tournament-type beam switching circuit $3_N$. These N tournament-type beam switching circuits $3_1-3_N$ form tournament-type beam switching unit 3. The beams formed by N subarrays are switched by controlling tournament-type beam switching circuits $3_1-3_N$ by means of switch drivers $4_1-4_N$.

Figure 5:
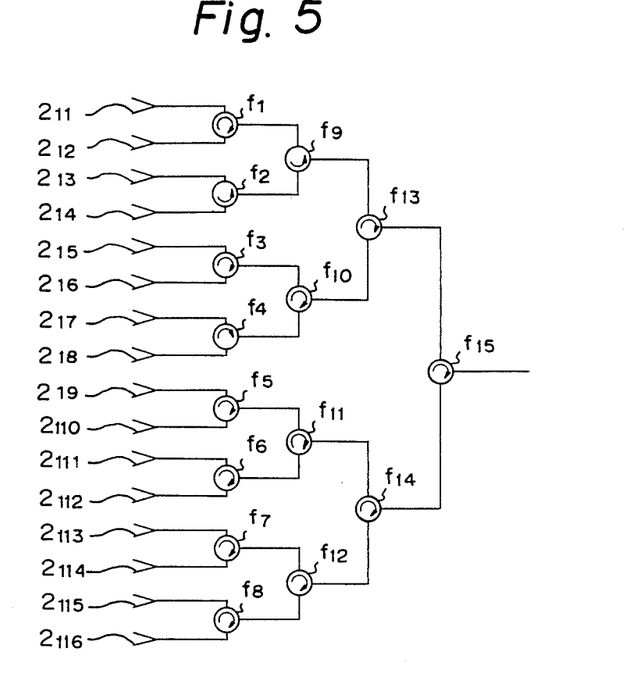
FIG. 5 shows an example of the tournament-type beam switching circuit shown in FIG. 3

Each of the tournament-type beam switching circuits $3_1-3_N$ is connected through a corresponding one of low-noise receivers $5_1-5_N$ in receiver unit 5 to a corresponding one of integrators $6_1-6_N$ in integrator unit 6. The outputs from integrators $6_1-6_N$ are fed to signal processing unit 7. N beam switching circuits have the same construction. FIG. 5 shows, as an example, the construction of tournament-type beam switching circuit $3_1$. In this figure, the number of conical horns in the first subarray is sixteen and ferrite switches $f_1$-$f_{15}$ are coupled to conical horns $2_{11}$-$2_{116}$ in a tournament manner. Switch drivers $4_1$-$4_N$ operates to cause beam switching circuits $3_1$-$3_N$ to select one radiator at one time from each subarray. For example, when control signals from switch driver $4_1$ cause the direction of ferrite switches $f_1$-$f_{15}$ to be set as shown in FIG. 5, only one conical horn $2_{14}$ is selected and a signal received thereby passes through ferrite switches $f_2$, $f_9$ and $f_{13}$ to ferrite switch $f_{15}$.

The signals output from N-tournament-type beam switching circuits $3_1$-$3_N$ are input to low-noise receiver $5_1$-$5_N$. Each low-noise receiver amplifies and detects an input signal and outputs the detected signal to a corresponding one of integrators $6_1$-$6_N$. Each integrator integrates an input signal for the period of integration time $\tau$ and outputs the integrated signal to signal processing unit 7. Signal processing unit 7 combines the signals output from integrators $6_1$-$6_N$ to obtain the brightness temperature value of an object.

Figure 6:
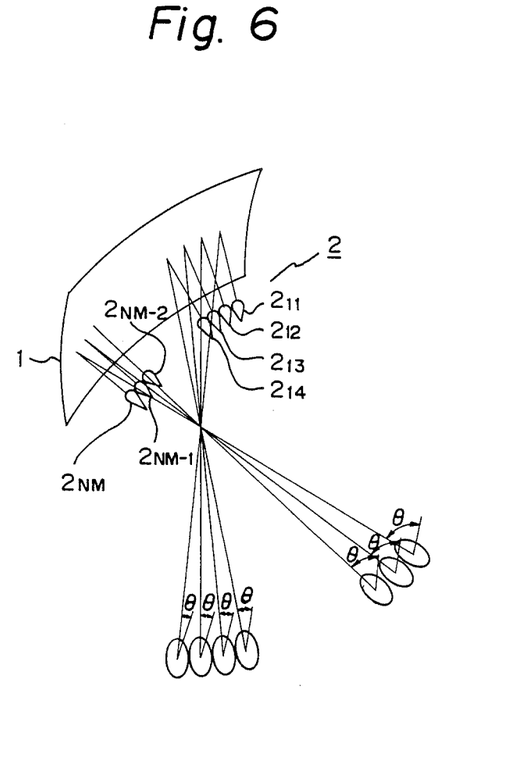
FIG. 6 shows foot prints formed by the radiators arranged along the focal line of the reflector shown in FIG. 3 and disposed in the configuration of a circular arch on the earth's surface.

Since conical horns $2_{11}$-$2_{NM}$ forming array 2 are arranged on focal having line F having the configuration of a circular arch as shown in FIG. 4, the footprints on the earth's surface corresponding to the respective conical horns $2_{11}$-$2_{NM}$ take the configuration of a circular arch. The conical scan can therefore be achieved by sequentially switching a different set of N radiators selected one by one from the respective N subarrays. Specifically, groups of N conical horns ($2_{11}$, $2_{21}$, $2_{31}$, ..., $2_{N1}$), ($2_{12}$, $2_{22}$, $2_{32}$, ..., $2_{N2}$), ..., ($2_{1M}$, $2_{2M}$, $2_{3M}$, ..., $2_{NM}$) are selected and switched in sequence. The fact that the ESMR according to the present invention can performed the conical scan enables the incident angles on the earth's surface within the scanned area to be kept constant. Further, the beam switching in the unit of N allows the scanning width corresponding to one of the above groups of N conical horns to be equal to 1/N of the entire scanning width. This makes the integration period N times as much as that in the case of scanning the entire scanned area by a single beam. As a result, the temperature resolution of the ESMR according to the present invention is given as follows:

$$\Delta T = K \cdot (T_A + T_R)/\sqrt{NB\tau} \qquad (3)$$

As will be clear from the comparison between equations (2) and (3), the temperature resolution according to the present invention is improved $\sqrt{}/N$ times as much as in the conventional ESMR.

Figure 7:
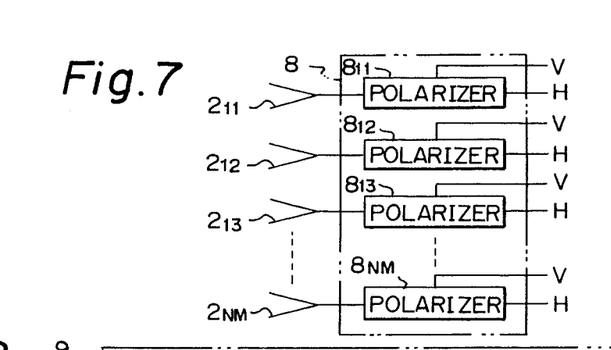
FIG. 7 is a block diagram showing the construction of the second embodiment of an electrically scanning microwave radiometer according to the present invention.

FIG. 7 shows the second embodiment of an electrically scanning microwave radiometer according to the present invention, wherein each of the conical horns forming a radiator array has its own polarizer for enabling the simultaneous measurements using vertically and horizontally polarized waves to be performed. In this embodiment, each of conical horns $2_{11}$, $2_{12}$, $2_{13}$, ..., $2_{NM}$ is connected to a corresponding one of polarizers $8_{11}$, $8_{12}$, $8_{13}$, ..., $8_{NM}$, by which means a received signal is separated into a vertically polarized signal and a horizontally polarized signal. In FIG. 7, the vertically polarized signals are indicated by "V" and the horizontally polarized signals are indicated by "H". The vertically polarized signals output from polarizers $8_{11}$-$8_{NM}$ are fed to a set of N tournament-type beam switching circuits provided in correspondence with N subarrays. The output of each of these beam switching circuits is connected through a low-noise receiver and an integrator to a signal processing unit. Similarly, the horizontally polarized signals output from polarizers $8_{11}$-$8_{NM}$ are fed to another set of N tournament-type beam switching circuits provided in correspondence with N subarrays. The output of each of these beam switching circuits is connected through a low-noise receiver and an integrator to another signal processing unit. Thus, N tournament-type beam switching circuits, N low-noise receivers, N integrators and one signal processing unit are provided for each polarized wave.

The tournament-type beam switching circuits, low-noise receivers, integrators and signal processing units used in the second embodiment are identical to those used in the first embodiment and description thereof is omitted here.

Figure 8:
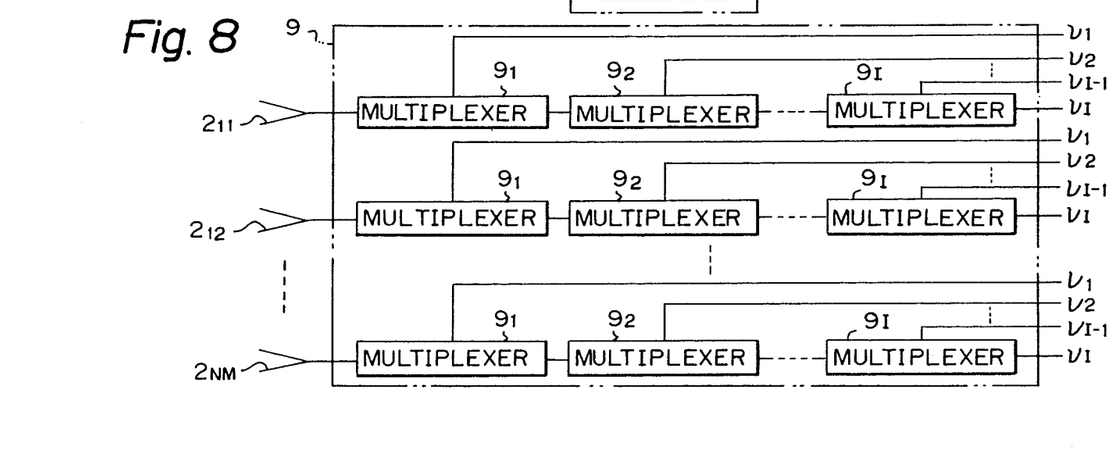
FIG. 8 is a block diagram showing the construction of the third embodiment of an electrically scanning microwave radiometer according to the present invention.

FIG. 8 shows the third embodiment of an ESMR according to the present invention. In this figure, each of conical horns $2_{11}$, $2_{12}$, ..., $2_{NM}$ is connected to a set of serially connected multiplexers $9_1$, $9_2$, ..., $9_I$ which separate signals having frequencies $\nu_1\nu_2$, ..., respectively, to enable simultaneous measurements at multiple frequencies. For each frequency, N tournament-type beam switching circuits, N low-noise receivers, N integrators and one signal processing unit are provided.

Figure 9:
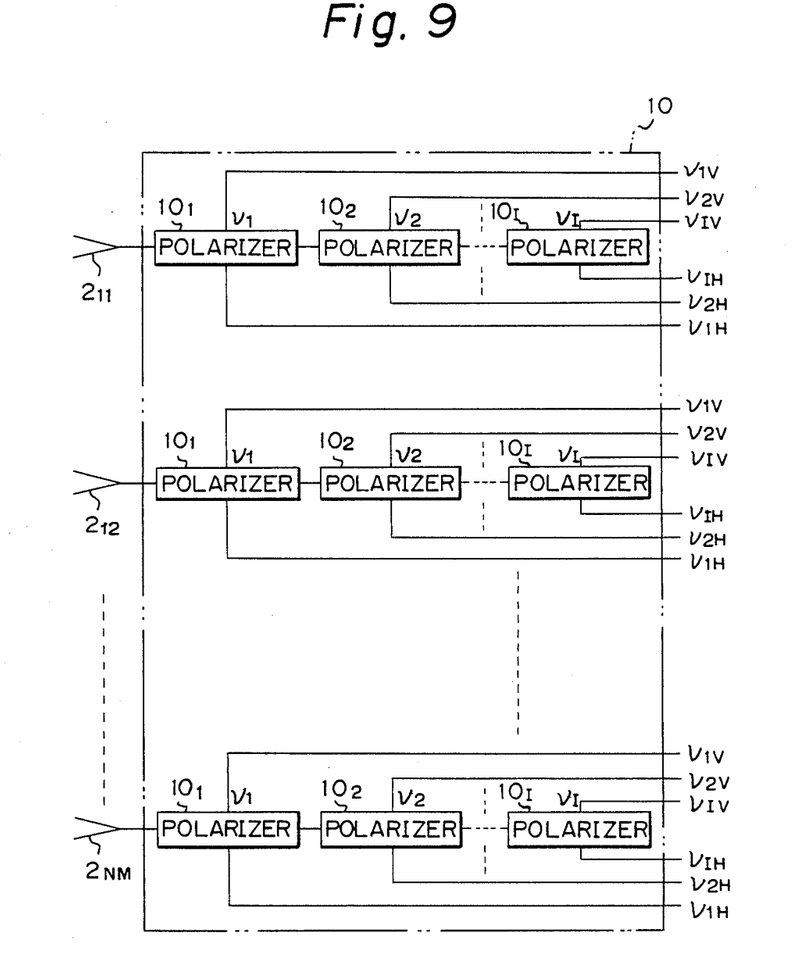
FIG. 9 is a block diagram showing the construction of the fourth embodiment of an electrically scanning microwave radiometer according to the present invention.

FIG. 9 shows the fourth embodiment of an ESMR according to the present invention which enables simultaneous measurements at multiple frequencies with two orthogonally polarized waves. In this embodiment, each of conical horns $2_{11}$-$2_{NM}$ is connected to a set of serially connected frequency selective polarizers $10_1$, $10_2$, ..., $10_I$ which operate to output vertical polarized signals and horizontally polarized signals at different frequencies $\nu_1$, $\nu_2$, ..., $\nu_I$, respectively. In FIG. 9, the frequencies at which the respective polarizers operate are indicated above them.

In this embodiment, $N \times M$ vertically polarized signals and $N \times M$ horizontally polarized signals are output from polarizer unit 10 at each of frequencies $\nu_1$-$\nu_I$. Symbol "$\nu_i V$" designates a vertically polarized signal having frequency $\nu_i$ and symbol "$\nu_i H$" designates a horizontally polarized signal having frequency $\nu_i$, where i=1, 2, ..., I.

The vertically polarized signals having frequency $\nu_i$ receiving by any one of N subarrays and output from polarizers $10_i$ are fed to a tournament-type beam switching circuit which is coupled through a low-noise receiver and an integrator to a signal processing unit. Thus, N-tournament-type beam switching circuits, N low-noise receivers, N integrators and one signal processing unit are provided for the vertically polarized signals having each of frequencies $\nu_1$-$\nu_I$. Similarly, the horizontally polarized signal having frequency $\nu_i$ receiving by any one of N subarrays and output from polarizers $10_i$ are fed to a tournament-type beam switching circuit which is coupled through a low-noise receiver and an integrator to a signal processing unit. Thus, N tournament-type beam switching circuits, N-low-noise receivers, N integrators and one signal processing unit are provided for the horizontally polarized signals having each of frequencies $\nu_1$-$\nu_I$.

Figure 10:
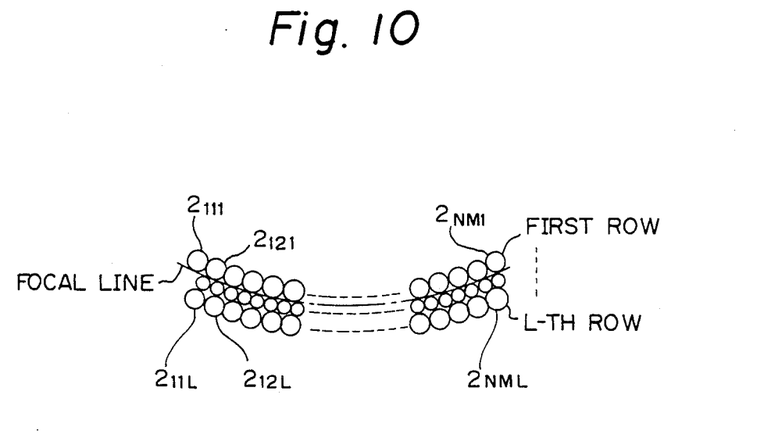
FIG. 10 shows a modification of the second, third and fourth embodiments of the present invention, wherein a plurality of arrays of radiators are arranged along the focal line of the reflector.

The descriptions of the second to fourth embodiments have been made on the assumption that a single array of conical horns is arranged along the focal line of the torus-type reflector. It is possible, however, to arrange a plurality of arrays of conical horns along the focal line. FIG. 10 shows a modification of the second to fourth embodiments. A number L of arrays of conical horns $2_{111}, 2_{121}, \ldots, 2_{NM1}; \ldots; 2_{11L}, 2_{NML}$ are arranged along focal line F of the torus-type reflector. In this modification, the conical horns are respectively connected to multiplexers to enable simultaneous measurements at a plurality of frequencies, or to sets of serially connected frequency selective polarizers operating at different frequencies to enable simultaneous measurements at multiple frequencies with two orthogonal polarizations.

When a single array of conical horns is arranged along the focal line of the torus-type reflector, there is a limitation with respect to the number of frequencies that can be used by the respective conical horns. For example, the upper limit to the number of frequencies that can be used in common is there. On the other hand, when a plurality of arrays of conical horns are arranged along a focal line as shown in FIG. 10, more frequencies can be used by the respective conical horns than the case where a single array of conical horns is arranged along the focal line, because multiple frequencies can be used by the conical horns in each of the plurality of arrays.

Further, if a plurality of arrays of conical horns operate in the same frequency band, the interval of sampling measured data can be made smaller by displacing the conical horns of each array in the direction of the arrays.

The invention has been described in detail with particular reference to certain preferred embodiments thereof, but it will be understood that certain variations and modifications can be effected within the spirit and scope of the invention. For example, pyramidal horns, diagonal horns, corrugated horns or multi-mode horns can be used in place of the conical horns described herein, while the ferrite switches used in the tournament-type beam switching circuits can be replaced by PIN diode switches.

What is claimed is:

1. An electrically scanning microwave radiometer for measuring the brightness temperature of an object by performing conical scanning of the object comprising:
   reflector means having a focal line of predetermined configuration;
   an array of $N \times M$ radiators arranged along the focal line of said reflector means, where M and N are integers, M being more than two and N being more than one, said radiators being grouped to form a number N of subarrays each including M adjacent radiators;
   a number N of beam switching means provided in correspondence with said respective subarrays and operable to switch beams formed by said radiators correspondingly selected from said respective subarrays to output a different set of N signals sequentially; and
   signal processing means for receiving and arithmetically operating the sequentially output sets of N signals from said N beam switching means to obtain the brightness temperature value of the object located within the width of the antenna beam, thereby suppressing the variation of the brightness temperature value and making the value of temperature resolution smaller.

2. Radiometer as claimed in claim 1, further comprising $N \times M$ frequency selective means each receiving the output from a corresponding one of said radiators so as to output signals having different frequencies, and wherein N beam switching means, N low-noise receivers, N integrators and one signal processing unit are provided for each of said different frequencies, thereby enabling simultaneous measurements at multiple frequencies to be performed.

3. Radiometer as claimed in claim 2 wherein said reflector means comprises torus-type reflector means, and the focal line is a circular focal line.

4. Radiometer as claimed in claim 1, further comprising $N \times M$ polarization and frequency selective means, each being adapted to receive the output from a corresponding one of the radiators in said N subarrays so as to output orthogonally polarized signals having different frequencies, wherein N beam switching means, N low-noise receivers, N integrators and one signal processing unit are provided for each frequency and each polarization, thereby enabling simultaneous measurements with different frequencies and with different polarizations to be performed.

5. Radiometer as claimed in claim 4 wherein said reflector means comprises torus-type reflector means, and the focal line is a circular focal line.

6. Radiometer as claimed in claim 1 wherein said signal processing means comprises:
   N low-noise receiver, each receiving the ouptut from a corresponding one of said N beam switching means to amplify and detect the received output;
   N integrators, each receiving and integrating the detected signal output from a corresponding one of said N low-noise receivers to obtain the average brightness temperature value of the object; and
   a signal processing unit for receiving and combining the integrated signals output from said N integrators of obtain the brightness temperature value of the object.

7. Radiometer as claimed in claim 6, further comprising $N \times M$ polarization selective means each connected to the output of a corresponding one of said radiators so as to output orthogonally polarized signals, and wherein said N beam switching means, N low-noise receivers and N integrators and one signal processing unit are provided for each of said orthogonally polarized signals, thereby enabling simultaneous measurements with different polarizations to be performed.

8. Radiometer as claimed in claim 6, further comprising $N \times M$ frequency selective means each receiving the output from a corresponding one of said radiators so as to output signals having different frequencies, and wherein said N beam switching means, N low-noise receivers, N integrators and one signal processing unit are provided for each of said different frequencies, thereby enabling simultaneous measurements at multiple frequencies to be performed.

9. Radiometer as claimed in claim 6, further comprising $N \times M$ polarization and frequency selective means, each being adapted to receive the output from a corresponding one of the radiators in said N subarrays so as to output orthogonally polarized signals having different frequencies, wherein said N beam switching means, N low-noise receivers, N integrators and one signal processing unit are provided for each frequency and each polarization, thereby enabling simultaneous measurements with different frequencies and with different polarizations to be performed.

10. Radiometer as claimed in claim 1 wherein said reflector means comprises torus-type reflector means, and the focal line is a circular focal line.

11. An electrically scanning microwave radiometer for measuring the brightness temperature of an object by performing conical scanning of the object comprising:
   torus-type reflector means having a circular focal line;
   an array of N×M radiators arranged along the circular focal line of said reflector means, where M and N are integers, M being more than two and N being more than one, said radiators being grouped to form a number N of subarrays each including M adjacent radiators;
   a number N of tournament-type beam switching means respectively connected to the outputs of the radiators in a corresponding one of said N subarrays and operable to switch beams formed by said radiators correspondingly selected from said respective subarrays to output a different set of N signals sequentially; and
   signal processing means for receiving and arithmetically operating the sequentially output sets of N signals from said N beam switching means to obtain the brightness temperature value of the object located within the width of the antenna beam, thereby suppressing the variation of the brightness temperature value and making the value of temperature resolution smaller.

12. Radiometer as claimed in claim 11 wherein each said tournament-type beam switching means is comprised of a plurality of switching arrays coupled in series with each successive array being smaller than the preceding array.

13. Radiometer as claimed in claim 11 wherein said signal processing means comprises:
   N low-noise receivers, each receiving the output from a corresponding one of said N beam switching means to amplify and detect the received output;
   N integrators, each receiving and integrating the detected signal output from a corresponding one of said N low-noise receivers to obtain the average brightness temperature value of the object; and
   a signal processing unit for receiving and combining the intergrated signals output from said N integrators to obtain the brightness temperature value of the object.

14. Radiometer as claimed in claim 13, further comprising N×M polarization selective means each connected to the output of a corresponding one of said radiators so as to output orthogonally polarized signals, and wherein said N beam switching means, N low-noise receivers and N integrators and one signal processing unit are provided for each of said orthogonally polarized signals, thereby enabling simultaneous measurements with different polarizations to be performed.

15. Radiometer as claimed in claim 14 wherein each of said tournament-type beam switching means comprises ferrite switches connected in a tournament manner.

16. Radiometer as claimed in claim 14 wherein each of said tournament-type beam switching means comprises PIN diode switches connected in a tournament manner.

17. Radiometer as claimed in claim 13, further comprising N×M frequency selective means each receiving the output from a corresponding one of said radiators so as to output signals having different frequencies, and wherein said N beam switching means, N low-noise receivers, N integrators and one signal processing unit are provided for each of said different frequencies, thereby enabling simultaneous measurements at multiple frequencies to be performed.

18. Radiometer as claimed in claim 17 wherein each of said tournament-type beam switching means comprising ferrite switches connected in a tournament manner.

19. Radiometer as claimed in claim 17 wherein each of said tournament-type beam switching means comprises PIN diode switches connected in a tournament manner.

20. Radiometer as claimed in claim 13, further comprising N×M polarization and frequency selective means, each being adapted to receive the output from a corresponding one of the radiators in said N subarrays so as to output orthogonally polarized signals having different frequencies, wherein said N beam switching means, N low-noise receivers, N integrators and one signal processing unit are provided for each frequency and each polarization, thereby enabling simultaneous measurements with different frequencies and with different polarizations to be performed.

21. Radiometer as claimed in claim 20 wherein each of said tournament-type beam switching means comprises ferrite switches connected in a tournament manner.

22. Radiometer as claimed in claim 20 wherein each of said tournament-type beam switching means comprises PIN diode switches connected in a tournament manner.

23. An electrically scanning microwave radiometer for measuring the brightness temperature of an object at multiple frequencies by performing conical scanning of the object comprising:
   torus-type reflector means having a circular focal line;
   a number L of arrays, each including N×M radiators arranged along the circular focal line of said reflector means, where L, M and N are integers, L and M being more than two and N being more than one, said radiators in each of said L arrays being grouped to form a number N of subarrays each including M adjacent radiators;
   a number L×N×M of frequency selective means, each receiving the output from a corresponding one of said radiators in said N subarrays of the respective L arrays so as to output signals having different frequencies;
   a number L×N of tournament-type beam switching means provided in correspondence with said L×N subarrays to respectively receive the outputs from the frequency selective means connected to a corresponding one of said L×N subarrays, and operable to allow beams formed at said different frequencies by said radiators correspondingly selected from said L×N subarrays to be switched to sequentially output a set of L×N signals for each frequency; and
   signal processing means for receiving and arithmetically operating the sets of L×N signals sequentially output for each frequency from said L×N beam switching means to obtain the brightness temperature value of the object located within the width of the antenna beam, thereby enabling simultaneous measurements at multiple frequencies to be performed, suppressing the variation of the brightness temperature value and making the value of temperature resolution smaller.

24. The radiometer as claimed in claim 23 wherein said signal processing means comprises:
   a number L×N of low-noise receivers, each receiving the output from a corresponding one of said L×N beam switching means to amplify and detect the received output;
   a number L×N of integrators, each receiving and integrating the detected signal output from a corresponding one of said low-noise receivers to obtain the average brightness temperature value of the object; and
   a number L of signal processing units, each receiving and combining the integrated signals output from said N integrators provided in correspondence with each of said L arrays to obtain the brightness temperature value of the object.

25. Radiometer as claimed in claim 24 wherein each of said tournament-type beam switching means comprises ferrite switches connected in a tournament manner.

26. Radiometer as claimed in claim 24 wherein each of said tournament-type beam switching means comprises PIN diode switches connected in a tournament manner.

27. An electrically scanning microwave radiometer for measuring the brightness temperature of an object at multiple frequencies with two orthogonal polarizations by performing conical scanning of the object comprising:
   torus-type reflector means having a circular focal line;
   a number L of arrays, each including a number N×M of radiators arranged along the circular focal line of said reflector means, where L, M and N are integers, L and M being more than two and N being more than one, said radiators in each of said L arrays being grouped to form a number N of subarrays each including M adjacent radiators;
   a number L×N×M of polarization and frequency selective means, each receiving the output from a corresponding one of said radiators in said N subarrays of the respective L arrays so as to output orthogonally polarized signals having different frequencies;
   a number L×N of tournament-type beam switching means provided in correspondence with said N subarrays of said L arrays to respectively receive the outputs from the polarization and frequency selective means connected to a corresponding one of said L×N subarrays, and operable to allow beams formed at said different frequencies by said radiators correspondingly selected from said L×N subarrays to be switched to sequentially output a different set of L×N signals for each frequency and polarization; and
   signal processing means for receiving and arithmetically operating the sets of L×N signals sequentially output for each frequency and polarization from said L×N beam switching means to obtain the brightness temperature value of the object located within the width of the antenna beam, thereby enabling simultaneous measurements at multiple frequencies with orthogonal polarizations to be performed, suppressing the variation of the brightness temperature value and making the value of temperature resolution smaller.

28. Radiometer as claimed in claim 27 wherein said signal processing means comprises:
   a number 1×N of low-noise receivers, each receiving the output from a corresponding one of said L×N beam switching means to amplify and detect the received output;
   a number L×N of integrators, each receiving and integrating the detected signal output from a corresponding one of said low-noise receivers to obtain the average brightness temperature value of the object; and
   a number L of signal processing units, each receiving and combining the integrated signals output from said N integrators provided in correspondence with each of said L arrays to obtain the brightness temperature value of the object.

29. Radiometer as claimed in claim 28 wherein each of said tournament-type beam switching means comprises ferrite switches connected in a tournament manner.

30. Radiometer as claimed in claim 28 wherein each of said tournament-type beam switching means comprises PIN diode switches connected in a tournament manner.

31. An electrically scanning microwave radiometer for measuring the brightness temperature of an object by performing conical scanning of the object comprising:
   torus-type reflector means having a circular focal line;
   an array of N×M radiators arranged along the circular focal line of said reflector means, where M and N are integers, M being more than two and N being more than one, said radiators being grouped to form a number N of subarrays each including M adjacent radiators;
   a number N of beam switching means, each comprising a multiply branching switching array, respectively connected to the outputs of the radiators in a corresponding one of said N subarrays and operable to switch beams formed by said radiators correspondingly selected from said respective subarrays to output a different set of N signals sequentially; and
   signal processing means for receiving and arithmetically operating the sequentially output sets of N signals from said N beam switching means to obtain the brightness temperature value of the object located within the width of the antenna beam, thereby suppressing the variation of the brightness temperature value and making the value of temperature resolution smaller.

32. Radiometer as claimed in claim 31 wherein said multiply branching switching array comprises a multiply bilaterally branching switching array.

33. Radiometer as claimed in claim 31 wherein said signal processing means comprises:
   N low-noise receivers, each receiving the output from a corresponding one of said N beam switching means to amplify and detect the received output;
   N integrators, each receiving and integrating the detected signal output from a corresponding one of said N low-noise receivers to obtain the average brightness temperature value of the object; and
   a signal processing unit for receiving and combining the integrated signals output from said N integrators to obtain the brightness temperature value of the object.

34. Radiometer as claimed in claim 33, further comprising N×M polarization selective means each connected to the output of a corresponding one of said radiators so as to output orthogonally polarized signals, and wherein said N beam switching means, N low-noise receivers and N integrators and one signal processing unit are provided for each of said orthogonally polarized signals, thereby enabling simultaneous measurements with different polarizations to be performed.

35. Radiometer as claimed in claim 34 wherein each of said beam switching means comprises ferrite switches connected in a repeatedly branching connection array to form the multiply branching switching array.

36. Radiometer as claimed in Claim 35 wherein said repeatedly branching connection array comprises a repeatedly bilaterally branching connection array.

37. Radiometer as claimed in claim 34 wherein each of said beam switching means comprises PIN diode switches connected in a repeatedly branching connection array to form the multiply branching switching array.

38. Radiometer as claimed in claim 37 wherein said repeatedly branching connection array comprises a repeatedly bilaterally branching connection array.

39. Radiometer as claimed in claim 33, further comprising N×M frequency selective means each receiving the output from a corresponding one of said radiators so as to output signals having different frequencies, and wherein said N beam switching means, N low-noise receivers, N integrators and one signal processing unit are provided for each of said different frequencies, thereby enabling simultaneous measurements at multiple frequencies to be performed.

40. Radiometer as claimed in claim 39 wherein each of said beam switching means comprises ferrite switches connected in a repeatedly branching connection array to form the multiply branching switching array.

41. Radiometer as claimed in claim 40 wherein said repeatedly branching connection array comprises a repeatedly bilaterally branching connection array.

42. Radiometer as claimed in claim 39 wherein each of said beam switching means comprises PIN diode switches connected in a repeatedly branching connection array to form the multiply branching switching array.

43. Radiometer as claimed in claim 42 wherein said repeatedly branching connection array comprises a repeatedly bilaterally branching connection array.

44. Radiometer as claimed in claim 33, further comprising N×M polarization and frequency selective means, each being adapted to receive the output from a corresponding one of the radiators in said N subarrays so as to output orthogonally polarized signals having different frequencies, wherein said N beam switching means, N low-noise receivers, N integrators and one signal processing unit are provided for each frequency and each polarization, thereby enabling simultaneous measurements with different frequencies and with different polarizations to be performed.

45. Radiometer as claimed in claim 44 wherein each of said beam switching means comprises ferrite switches connected in a repeatedly branching connection array to form the multiply branching switching array.

46. Radiometer as claimed in claim 45 wherein said repeatedly branching connection array comprises a repeatedly bilaterally branching connection array.

47. Radiometer as claimed in claim 39 wherein each of said beam switching means comprises PIN diode switches connected in a repeatedly branching connection array to form the multiple branching switching array.

48. Radiometer as claimed in claim 47 wherein said repeatedly branching connection array comprises a repeatedly bilaterally branching connection array.

49. An electrically scanning microwave radiometer for measuring the brightness temperature of an object at multiple frequencies by performing conical scanning of the object comprising:
   torus-type reflector means having a circular focal line;
   a number L of arrays, each including N×M radiators arranged along the circular focal line of said reflector means, where L, M and N are integers, L and M being more than two and N being more than one, said radiators in each of said L arrays being grouped to form a number N of subarrays each including M adjacent radiators;
   a number L×N×M of frequency selective means, each receiving the output from a corresponding one of said radiators in said N subarrays of the respective L arrays so as to output signals having different frequencies;
   a number L×N of beam switching means, each comprising a multiply branching switching array, provided in correspondence with said L×N subarrays to respectively receive the outputs from the frequency selective means connected to a corresponding one of said L×N subarrays, and operable to allow beams formed at said different frequencies by said radiators correspondingly selected from said L×N subarrays to be switched to sequentially output a set of L×N signals for each frequency; and
   signal processing means for receiving and arithmetically operating the sets of L×N signals sequentially output for each frequency from said L×N beam switching means to obtain the brightness temperature value of the object located within the width of the antenna beam, thereby enabling simultaneous measurements at multiple frequencies to be performed, suppressing the variation of the brightness temperature value and making the value of temperature resolution smaller.

50. Radiometer as claimed in claim 49 wherein said multiply branching switching array comprises a multiply bilaterally branching switching array.

51. Radiometer as claimed in claim 49 wherein said signal processing means comprises:
   a number L×N of low-noise receivers, each receiving the output from a corresponding one of said L×N beam switching means to amplify and detect the received output;
   a number L×N of integrators, each receiving and integrating the detected signal output from a corresponding one of said low-noise receivers to obtain the average brightness temperature value of the object; and
   a number L of signal processing units, each receiving and combining the integrated signals output from said N integrators provided in correspondence with each of said L arrays to obtain the brightness temperature value of the object.

52. Radiometer as claimed in claim 51 wherein said each of said beam switching means comprises ferrite switches connected in a repeatedly branching connection array to form the multiple branching switching array.

53. Radiometer as claimed in claim 52 wherein said repeatedly branching connection array comprising a repeatedly bilaterally branching connection array.

54. Radiometer as claimed in claim 51 wherein each of said beam switching means comprises PIN diode switches connected in a repeatedly branching connection array to form the multiply branching switching array.

55. Radiometer as claimed in claim 54 wherein said repeatedly branching connection array comprises a repeatedly bilaterally branching connection array.

56. An electrically scanning microwave radiometer for measuring the brightness temperature of an object of multiple frequencies with two orthogonal polarizations by performing conical scanning of the object comprising:

torus-type reflector means having a circular focal line;

a number L of arrays, each including a number $N \times M$ of radiators arranged along the circular focal line of said reflectors means, where L, M and N are integers, L and M being more than two and N being more than one, said radiators in each of said L arrays being grouped to form a number N of subarrays each including M adjacent radiators;

a number $L \times N \times M$ of polarization and frequency selective means, each receiving the output from a corresponding one of said radiators in said N subarrays of the respective L arrays so as to output orthogonally polarized signals having different frequencies;

a number $L \times N$ of beam switching means, each comprising a multiply branching switching array, provided in correspondence with said N subarrays of said L arrays to respectively receive the outputs from the polarization and frequency selective means connected to a corresponding one of said $L \times N$ subarrays, and operable to allow beams formed at said different frequencies by said radiators correspondingly selected from said $L \times N$ subarrays to be switched to sequentially output a different set of $L \times N$ signals for each frequency and polarization; and signal processing means for receiving and arithmetically operating the sets of $L \times N$ signals sequentially output for each frequency and polarization from said $L \times N$ beam switching means to obtain the brightness temperature value of the object located within the width of the antenna beam, thereby enabling simultaneous measurements at multiple frequencies with orthogonal polarizations to be performed, suppressing the variation of the brightness temperature value and making the value of temperature resolution smaller.

57. Radiometer as claimed in claim 56 wherein said multiply branching switching array comprises a multiply bilaterally branching switching array.

58. Radiometer as claimed in claim 56 wherein said signal processing means comprises:

a number $L \times N$ of low-noise receivers, each receiving the output from a corresponding one of said $L \times N$ beam switching means to amplify and detect the received output;

a number $L \times N$ of integrators, each receiving and integrating the detected signal output from a corresponding one of said low-noise receivers to obtain the average brightness temperature value of the object; and a number L of signal processing units, each receiving and combining the integrated signals output from said N integrators provided in correspondence with each of said L arrays to obtain the brightness temperature value of the object.

59. Radiometer as claimed in claim 58 wherein each of said beam switching means comprises ferrite switches connected in a repeatedly branching connection array to form the multiply branching switching array.

60. Radiometer as claimed in claim 59 wherein said repeatedly branching connection array comprises a repeatedly bilaterally branching connection array.

61. Radiometer as claimed in claim 58 wherein each of said beam switching means comprises PIN diode switches connected in a repeatedly branching connection array to form the multiply branching switching array.

62. Radiometer as claimed in claim 61 wherein said repeatedly branching connection array comprises a repeatedly bilaterally branching connection array.

* * * * *